(12) United States Patent
Kramer

(10) Patent No.: US 10,227,952 B2
(45) Date of Patent: Mar. 12, 2019

(54) GAS PATH LINER FOR A GAS TURBINE ENGINE

(75) Inventor: George J. Kramer, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1508 days.

(21) Appl. No.: 13/250,358

(22) Filed: Sep. 30, 2011

(65) Prior Publication Data

US 2013/0081398 A1 Apr. 4, 2013

(51) Int. Cl.
*F02K 1/12* (2006.01)
*F02K 1/80* (2006.01)
*F02K 1/82* (2006.01)

(52) U.S. Cl.
CPC ............... *F02K 1/805* (2013.01); *F02K 1/12* (2013.01); *F02K 1/80* (2013.01); *F02K 1/82* (2013.01)

(58) Field of Classification Search
CPC . F02K 1/822; F02K 1/805; F02K 1/82; F02K 1/1223; F02K 1/80; F02K 1/12; F02K 1/1207; F02K 1/52; F02K 1/825; F02K 9/64; F02K 9/972; F02K 1/827; F23R 3/002; F23R 2900/00005; F23R 2900/03042; F23R 2900/03043; F23R 2900/03044; F23R 3/005; F23R 3/08; F23R 3/16; F23R 3/26; F23R 3/60; B64D 33/04

USPC ............ 60/770, 771, 796–798; 239/265.11, 239/265.19, 265.33–265.43
See application file for complete search history.

(56) References Cited

U.S. PATENT DOCUMENTS

| | | | | |
|---|---|---|---|---|
| 5,039,014 | A * | 8/1991 | Lippmeier | 239/265.39 |
| 5,265,409 | A * | 11/1993 | Smith et al. | 60/798 |
| 5,528,904 | A * | 6/1996 | Jones et al. | 60/753 |
| 5,683,034 | A * | 11/1997 | Johnson et al. | 239/265.35 |
| 5,690,279 | A * | 11/1997 | Kramer et al. | 239/127.3 |
| 6,418,709 | B1 * | 7/2002 | Narcus et al. | 60/766 |
| 7,802,431 | B2 | 9/2010 | Parker | |
| 7,814,753 | B2 * | 10/2010 | Farah et al. | 60/796 |
| 7,866,158 | B2 * | 1/2011 | Murphy | 60/770 |
| 7,866,939 | B2 * | 1/2011 | Harper et al. | 415/9 |
| 8,122,722 | B2 * | 2/2012 | Senile et al. | 60/770 |
| 8,156,745 | B2 * | 4/2012 | Senile et al. | 60/770 |
| 2009/0217670 | A1 * | 9/2009 | Senile et al. | 60/770 |
| 2010/0107645 | A1 * | 5/2010 | Kollati | 60/752 |
| 2010/0278641 | A1 * | 11/2010 | Boman | 415/177 |
| 2010/0290892 | A1 * | 11/2010 | Schwaller | 415/119 |

* cited by examiner

*Primary Examiner* — Steven Sutherland
(74) *Attorney, Agent, or Firm* — O'Shea Getz P.C.

(57) ABSTRACT

An exhaust nozzle for a gas turbine engine includes a gas path liner connected to an interior surface of an exhaust nozzle flap. The gas path liner includes a liner backbone that extends along a liner axis, and a plurality of liner panels sequentially connected to the liner backbone along the axis. Each liner panel includes a panel length that extends axially from a first panel end to a second panel end, where the panel length thermally expands independent of the liner backbone

11 Claims, 3 Drawing Sheets

GAS PATH LINER FOR A GAS TURBINE ENGINE

This invention was made with government support under Contract No. N00019-02-C-3003 awarded by the United States Air Force. The government may have certain rights in the invention.

BACKGROUND OF THE INVENTION

1. Technical Field

The present invention relates to gas turbine engines and, in particular, to a gas path liner included, for example, in an exhaust nozzle for a gas turbine engine.

2. Background Information

A gas turbine engine exhaust nozzle is typically subject to relatively high gas path temperatures. Components of the exhaust nozzle therefore may be thermally shielded with gas path liners and/or cooled with cooling air to prolong engine life and permit higher engine performance and efficiency.

A typical gas path liner may be constructed from a single sheet of metal such as Columbium. The gas path liner may be fixedly secured to a respective nozzle component at a plurality of connection points. Such a gas path liner configuration, however, may subject the nozzle component and itself to relatively high internal stresses as the gas path liner material thermally expands relative to the nozzle component material. In addition, materials such as Columbium are relatively expensive and, thus, may be cost prohibitive. While some less expensive alternative heat shield materials may withstand the high gas path temperatures within the exhaust nozzle, they typically have relatively high thermal expansion rates and, thus, may increase internal stresses and cause interference with other engine components.

SUMMARY OF THE DISCLOSURE

According to a first aspect of the invention, an exhaust nozzle for a gas turbine engine includes a gas path liner connected to an interior surface of an exhaust nozzle flap. The gas path liner includes a liner backbone that extends along a liner axis, and a plurality of liner panels sequentially connected to the liner backbone along the axis. Each liner panel includes a panel length that extends axially from a first panel end to a second panel end, where the panel length thermally expands independent of the liner backbone.

According to a second aspect of the invention, a gas turbine engine includes a gas path liner connected to an interior surface of a gas path wall. The gas path liner includes a liner backbone extending along a liner axis, and a plurality of liner panels sequentially connected to the liner backbone along the axis. Each liner panel includes a panel length that extends axially from a first panel end to a second panel end, where the panel length thermally expands independent of the liner backbone.

The foregoing features and the operation of the invention will become more apparent in light of the following description and the accompanying drawings.

DETAILED DESCRIPTION OF THE INVENTION

Figure 1:
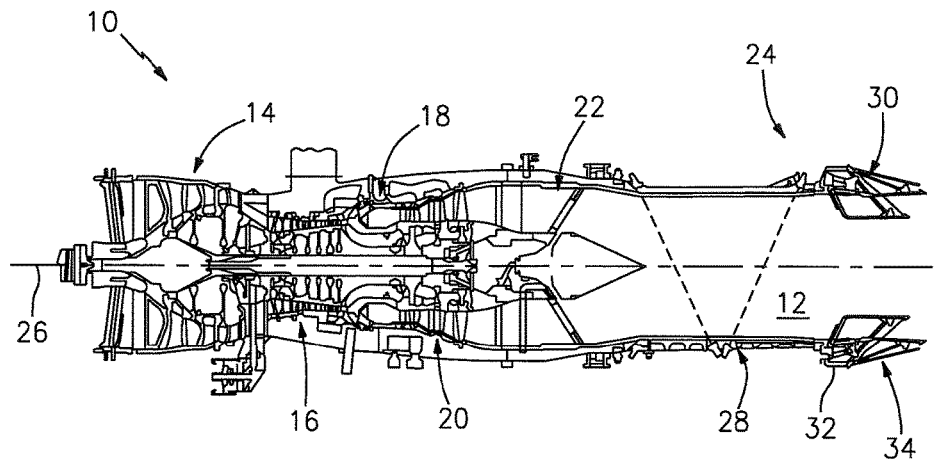
FIG. 1 is a cross-sectional illustration of a gas turbine engine.

FIG. 1 is a cross-sectional illustration of a gas turbine engine 10. The engine 10 includes a central gas path 12 that extends through a fan section 14, a compressor section 16, a combustor section 18, a turbine section 20, an augmentor section 22 and a nozzle section 24, which are sequentially arranged along an axial centerline 26.

The nozzle section 24 includes an exhaust duct 28 connected to an exhaust nozzle 30. An example of an exhaust duct is a multi bearing swivel exhaust duct as disclosed in U.S. Pat. No. 7,814,753, which is hereby incorporated by reference in its entirety, and is assigned to the assignee of the present invention. The present invention, however, is not limited to such a multi bearing swivel exhaust duct configuration.

Figure 2:
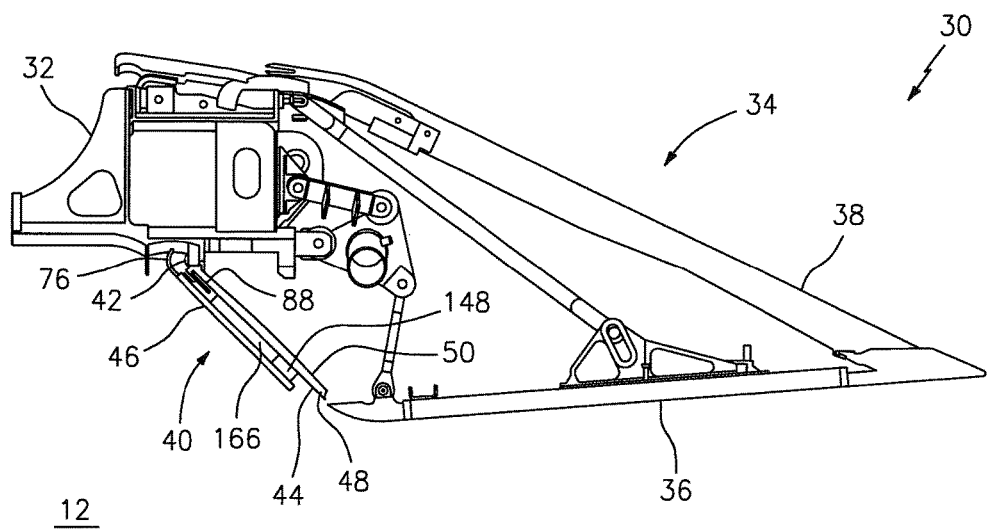
FIG. 2 is a cross-sectional perspective illustration of an exhaust nozzle flap system.

The exhaust nozzle 30 includes an exhaust nozzle base 32 connected to a plurality of exhaust nozzle flap systems 34 that are disposed circumferentially around the axial centerline 26. Each exhaust nozzle flap system 34 may move between a first configuration (e.g., an unrestricted configuration illustrated in the solid line) and a second configuration (e.g., a semi-restricted configuration illustrated in the ghost line). Referring to FIG. 2, each exhaust nozzle flap system 34 may include a divergent nozzle flap 36 connected between an aerodynamic exterior flap 38 and a convergent nozzle flap system 40.

The convergent nozzle flap system 40 includes a flap seal 42, a convergent nozzle flap 44 and a gas path liner 46. The convergent nozzle flap 44 extends radially between an interior surface 48 and an exterior surface 50, and is connected to the exhaust nozzle base 32 by the flap seal 42.

Figure 3:
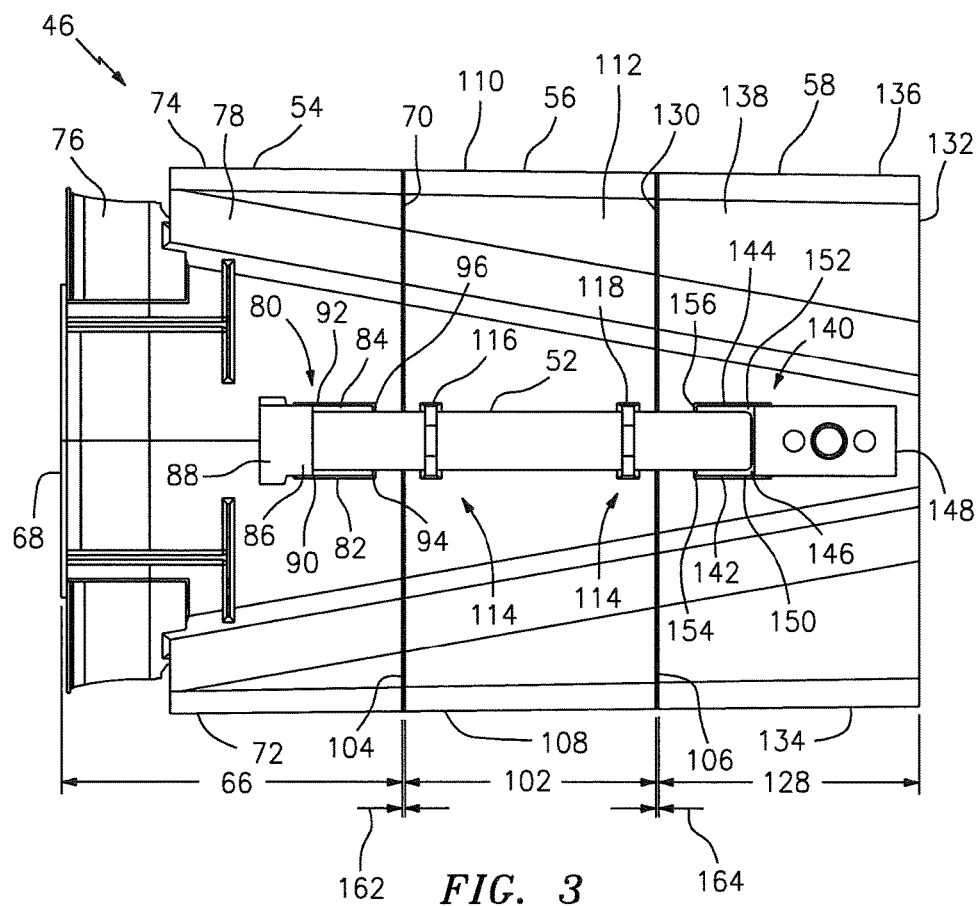
FIG. 3 is a top view illustration of a gas path liner.
Figure 4:
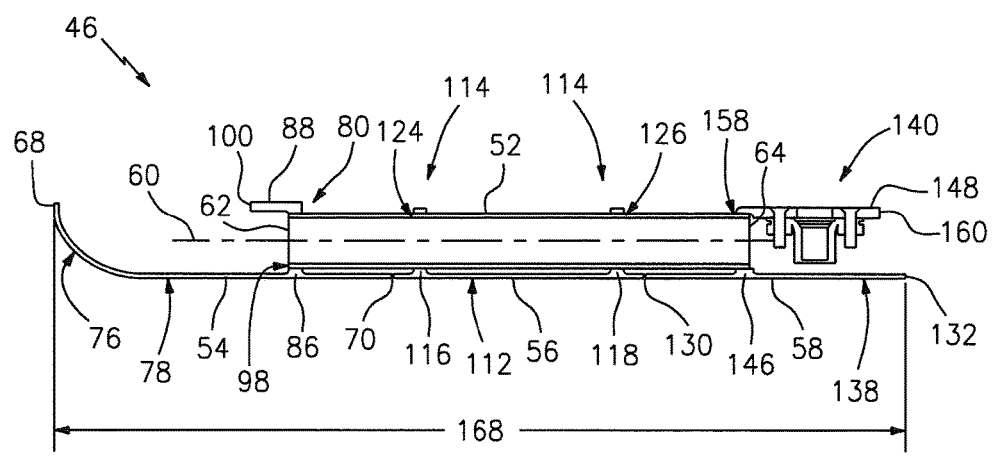
FIG. 4 is a cross-sectional illustration of the gas path liner illustrated in FIG. 3.
Figure 5:
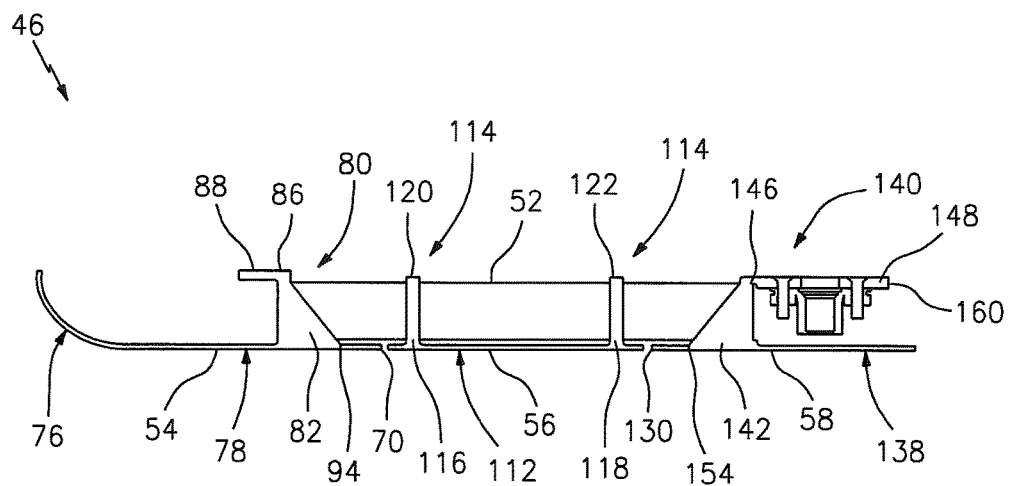
FIG. 5 is another cross-sectional illustration of the gas path liner illustrated in FIG. 3.

FIG. 3 is a top view illustration of the gas path liner 46. FIG. 4 is a cross-sectional illustration of the gas path liner 46. FIG. 5 is another cross-sectional illustration of the gas path liner 46. Referring to FIGS. 3-5, the gas path liner 46 includes a liner backbone 52 and a plurality of liner panels 54, 56 and 58.

Referring to FIG. 4, the liner backbone 52 (e.g., a circular, tubular liner backbone) extends along a liner axis 60 between a first backbone end 62 and a second backbone end 64.

Referring to FIG. 3, the liner panels may include a first liner panel 54, a second liner panel 56 and a third liner panel 58. The first liner panel 54 has a first panel length 66 that extends axially (e.g., substantially parallel to the liner axis 60) from a first panel end 68 to a second panel end 70. The first liner panel 54 extends laterally between a first panel side 72 and a second panel side 74. The first liner panel 54 may include a flap seal liner 76, a flap liner 78 and a first panel mount 80. Referring now to FIG. 4, the flap seal liner 76 extends axially from the first panel end 68 to the flap liner 78, and may have an arcuate cross-sectional geometry. The flap liner 78 extends axially from the flap seal liner 76 to the second panel end 70.

Referring to FIG. 3, the first panel mount 80 is connected to the flap liner 78, and is located (e.g., centered) between the first panel side 72 and the second panel side 74. The first panel mount 80 includes a first side support flange 82 (e.g., a tapered first side support flange), a second side support flange 84 (e.g., a tapered second side support flange), a backbone mounting flange 86 and a flap mounting bracket 88. Referring now to FIG. 5, each side support flange 82, 84 extends from a respective end 90, 92 (see FIG. 3) of the backbone mounting flange 86, for example towards the second panel end 70, to a respective distal end 94, 96 (see FIG. 3). The backbone mounting flange 86 extends radially from the flap liner 78 to the flap mounting bracket 88. Referring now to FIG. 4, the backbone mounting flange 86 includes a mounting aperture 98 extending axially therethrough. The flap mounting bracket 88 extends axially from the backbone mounting flange 86, for example towards the first panel end 68, to a distal end 100.

Referring to FIG. 3, the second liner panel 56 has a second panel length 102 that extends axially from a first panel end 104 to a second panel end 106. The second liner panel 56 extends laterally between a first panel side 108 and a second panel side 110. The second liner panel 56 includes a flap liner 112 and a second panel mount 114. The second panel mount 114 is connected to the flap liner 112, and is located (e.g., centered) between the first panel side 108 and the second panel side 110. The second panel mount 114 includes a first backbone mounting flange 116 and a second backbone mounting flange 118. Referring now to FIG. 5, each backbone mounting flange 116, 118 extends radially from the flap liner 112 to a respective distal end 120, 122 thereof. Referring now to FIG. 4, each backbone mounting flange 116, 118 includes a respective mounting aperture 124, 126 that extends axially therethrough.

Referring to FIG. 3, the third liner panel 58 has a third panel length 128 that extends axially from a first panel end 130 to a second panel end 132. The third liner panel 58 extends laterally between a first panel side 134 and a second panel side 136. The third liner panel 58 includes a flap liner 138 and a third panel mount 140. The third panel mount 140 is connected to the flap liner 138, and is located (e.g., centered) between the first panel side 134 and the second panel side 136. The third panel mount 140 includes a first side support flange 142 (e.g., a tapered first side support flange), a second side support flange 144 (e.g., a tapered second side support flange), a backbone mounting flange 146 and a flap mounting bracket 148. Referring now to FIG. 5, each side support flange 142, 144 extends from a respective end 150, 152 (see FIG. 3) of the backbone mounting flange 146, for example towards the first panel end 130, to a respective distal end 154, 156 (see FIG. 3). The backbone mounting flange 146 extends radially from the flap liner 138 to the flap mounting bracket 148. Referring now to FIG. 4, the backbone mounting flange 146 includes a mounting aperture 158 extending axially therethrough. The flap mounting bracket 148 extends axially from the backbone mounting flange 146, for example towards the second panel end 132, to a distal end 160.

The liner backbone 52 extends through the mounting apertures 98, 124, 126 and 158, which sequentially connects the liner panels 54, 56 and 58 to the liner backbone 52 along the liner axis 60. Referring to FIG. 3, the second panel end 70 is disposed a first axial distance 162 from the first panel end 104. The second panel end 106 is disposed a second axial distance 164 from the second panel end 130. The first axial distance 162 and the second axial distance 164 may be selected such that, for example, the liner panels 54, 56 and 58 do not axially contact one another as a result of thermal expansion.

Referring to FIG. 4, the backbone mounting flange 86 is axially secured (e.g., welded, braised, glued, etc.) to the first backbone end 62. The first backbone mounting flange 116 is axially secured (e.g., welded, braised, glued, etc.) to the liner backbone 52. The second backbone mounting flange 118 and the liner backbone 52 define an axial slip joint therebetween. The backbone mounting flange 146 is axially secured (e.g., welded, braised, pined, etc.) to the second backbone end 64. Referring now to FIG. 2, the flap seal liner 76 is arranged between the central gas path 12 and the flap seal 42. The flap mounting brackets 88 and 148 are connected to the interior surface 48, which define a flow channel 166 between the gas path liner 46 and the convergent nozzle flap 44.

Referring to FIGS. 2 and 4, relatively hot gas path air flows through the central gas path 12, and relatively cool cooling air flows through the flow channel 166 and the liner backbone 52 during engine operation. Referring to FIG. 4, the hot gas path air may subject the liner panels 54, 56 and 58 to relatively high temperatures, and the cooling air may subject the liner backbone 52 to relatively low temperatures. The liner panel material therefore may thermally expand to a greater degree than the liner backbone material. Thermal expansion of an overall axial length 168 of the gas path liner 46, however, is at least partially constrained by thermal expansion in the liner backbone 52 since each of the liner panels 54, 56, 58 is axially secured to the liner backbone 52. Referring to FIG. 3, thermal expansion of each of the panels lengths 66, 102, 128, in contrast, is independent of the liner backbone 52 since each of the liner panels 54, 56, 58 is axially secured to the liner backbone 52 at, for example, a single connection point. The second panel end 106, for example, may thermally expand away from the first backbone mounting flange 116 in a substantially axially unconstrained manner since the second backbone mounting flange 118 floats along the liner backbone 52. The thermal expansion of each of the panels lengths 66, 102, 128 is also independent of the respective other liner panels.

In some embodiments, each liner panel 54, 56, 58 may be cast from metal. Examples of suitable metals may include Inconel® alloy (e.g., Inconel® 718 manufactured by Special Metals Corp. of New Hartford, N.Y.), Murium, Mar-M-247® alloy (manufactured by Martin Marietta Materials of Raleigh, N.C.), Waspaloy® alloy (manufactured by United Technologies Corp. of Hartford, Conn.), Hastelloy® X alloy (manufactured by Haynes International, Inc. of Kokomo, Ind.), etc.

In other embodiments, the second backbone mounting flange 118 may be axially secured to the liner backbone 52 where, for example, the first backbone mounting flange 116 and the liner backbone 52 define an axial slip joint therebetween.

In other embodiments, the gas path liner may include a plurality of parallel extending liner backbones.

In other embodiments, the liner backbone may be connected to the interior surface, and the flap mounting brackets may be omitted.

Figure 6:
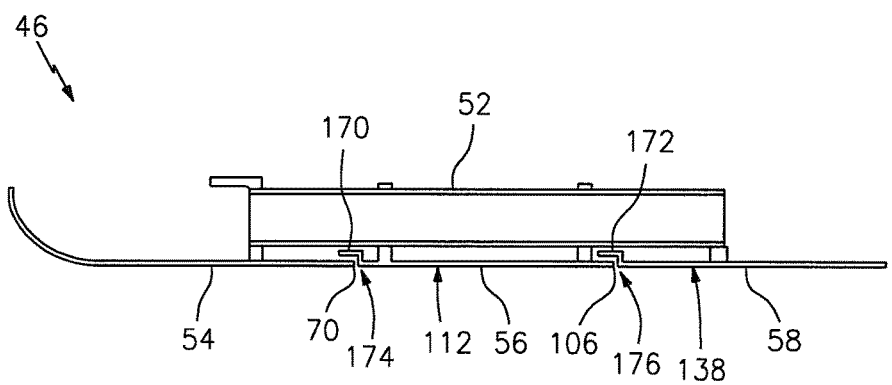
FIG. 6 is a cross-sectional illustration of an alternate embodiment gas path liner.

Referring to FIG. 6, in some embodiments, one or more of the liner panels 56 and 58 may also include a respective lap segment 170, 172 connected to the flap liner 112, 138. The lap segment 170, 172 may be recessed radially outwards relative to the respective flap liner 112, 138, and extend axially over a respective panel end 70, 106 of the adjacent liner panel 54, 56 defining a lap joint therebetween. In some embodiments, the lap segment 170, 172 may be separated from the respective panel end 70, 106 by a respective film cooling aperture 174, 176 that directs a portion of the cooling air through the gas path liner 46 to, for example, film cool the gas path liner 46.

One of ordinary skill in the art will recognize that the aforedescribed gas path liner may be used in alternate gas turbine engine applications. In some embodiments, for example, the gas path liner may be connected to an interior surface of a gas path wall in the combustion section, the augmentor section, etc.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An exhaust nozzle for a gas turbine engine having a centerline, the exhaust nozzle comprising:
   an exhaust nozzle flap comprising a radially interior surface relative to the centerline; and
   a gas path liner comprising
      a liner backbone extending along an axis, the liner backbone mounted to the radially interior surface and circumferentially aligned with the exhaust nozzle flap; and
      liner panels sequentially connected to the liner backbone along the axis, each liner panel comprising a panel length that extends axially from a first panel end to a second panel end, wherein the panel length thermally expands independent of the liner backbone.

2. The exhaust nozzle of claim 1, wherein the connection between a first one of the liner panels and the liner backbone consists essentially of a panel mount that axially secures the first one of the liner panels to the liner backbone at a single connection point.

3. The exhaust nozzle of claim 1, wherein the panel length of each liner panel thermally expands independent of the other liner panels.

4. The exhaust nozzle of claim 1, wherein a first one of the liner panels is connected to the liner backbone by a panel mount.

5. The exhaust nozzle of claim 4, wherein the panel mount comprises a backbone mounting flange that extends outwardly from the first one of the liner panels, wherein the backbone mounting flange comprises a mounting aperture into which the liner backbone extends, and wherein the backbone mounting flange is axially secured to the liner backbone.

6. The exhaust nozzle of claim 5, wherein the panel mount further comprises a second backbone mounting flange that extends outwardly from the first one of the liner panels, wherein the second backbone mounting flange comprises a second mounting aperture through which the liner backbone extends, and wherein the second backbone mounting flange floats axially along the liner backbone.

7. The exhaust nozzle of claim 1, wherein a first one of the liner panels comprises a flap seal liner segment located at the first panel end of the first one of the liner panels, and wherein the flap seal liner segment comprises an arcuate cross-sectional geometry.

8. The exhaust nozzle of claim 1, wherein the liner panels comprise a first liner panel and a second liner panel that comprises a recessed lap segment that extends axially over the second panel end of the first liner panel defining a lap joint therebetween.

9. The exhaust nozzle of claim 8, wherein the gas path liner further comprises a film cooling aperture defined between the recessed lap segment and the second panel end of the first liner panel.

10. The exhaust nozzle of claim 1, wherein the liner backbone comprises a tubular liner backbone.

11. The exhaust nozzle of claim 1, wherein a centerline of the liner backbone is circumferentially aligned with a centerline of the exhaust nozzle flap.

* * * * *